US012105206B2

(12) United States Patent
Czarnecky et al.

(10) Patent No.: US 12,105,206 B2
(45) Date of Patent: Oct. 1, 2024

(54) GPS TRACKING DEVICE WITH EXTENDED BATTERY LIFE

(71) Applicant: Pinpoint Ideas, LLC, Knoxville, TN (US)

(72) Inventors: Joseph Anthony Czarnecky, Okauchee, WI (US); Steven Andrew Rook, Cary, IL (US); Scott Allen Crutchfield, Oconomowoc, WI (US); Gregory Parker Stair, Knoxville, TN (US)

(73) Assignee: Pinpoint Ideas, LLC, Okouchee, WI (US)

( * ) Notice: Subject to any disclaimer, the term of this patent is extended or adjusted under 35 U.S.C. 154(b) by 374 days.

(21) Appl. No.: 17/166,581

(22) Filed: Feb. 3, 2021

(65) Prior Publication Data
US 2021/0160661 A1 May 27, 2021

Related U.S. Application Data

(63) Continuation-in-part of application No. 16/002,710, filed on Jun. 7, 2018, now abandoned.
(Continued)

(51) Int. Cl.
*G01S 19/14* (2010.01)
*G01S 5/00* (2006.01)
(Continued)

(52) U.S. Cl.
CPC ............ *G01S 19/14* (2013.01); *G01S 5/0027* (2013.01); *H04W 4/021* (2013.01); *H04W 4/029* (2018.02)

(58) Field of Classification Search
CPC ....... H04W 4/02; H04W 4/021; H04W 4/029; G06Q 10/08; G06Q 10/0833; G01S 19/34; G01S 19/42
See application file for complete search history.

(56) References Cited

U.S. PATENT DOCUMENTS 6,321,091 B1 * 11/2001 Holland ............... G01S 5/0027
455/414.2
6,700,533 B1    3/2004 Werb
(Continued)

FOREIGN PATENT DOCUMENTS

AU    2014277724 B2    7/2016
CA    2865371 A1    3/2015
(Continued)

OTHER PUBLICATIONS

Patent Cooperation Treaty, Int'l Search Report, Form PCT/ISA/220; Date of Mailing: Apr. 26, 2022.

*Primary Examiner* — Cassi J Galt
(74) *Attorney, Agent, or Firm* — Pitts Lake, LLC

(57) ABSTRACT

A boat, power sport, recreational vehicle or other asset system for GPS tracking with extended battery life comprising a GPS tracking device with internal battery supply attached to the boat, power sport, recreational vehicle or other asset, an SaaS Application in communication with the GPS tracking device that determines which data to collect from the GPS tracking device, which data to distribute and a frequency of data transmissions required as the boat, power sport, recreational vehicle or other asset moves from a manufacturer to a consumer in a supply chain, and collects the data that the GPS tracking device sends through wireless, cellular, WIFI or Blue Tooth technology, firmware that communicates with the SaaS Application and the GPS tracking device and updates rules within a chip or board on the GPS tracking device that determines what data to collect, what data to distribute, when to send data, how often data is sent, when the GPS tracking device will wake up and when the GPS tracking device will sleep, and an accelerometer embedded in the GPS tracking device that determines whether the GPS tracking device is moving or stationary 10 Claims, 10 Drawing Sheets

Related U.S. Application Data

(60) Provisional application No. 62/658,144, filed on Apr. 16, 2018.

(51) Int. Cl.
  *H04W 4/02* (2018.01)
  *H04W 4/021* (2018.01)
  *H04W 4/029* (2018.01)

(56) References Cited

U.S. PATENT DOCUMENTS

| | | | |
|---|---|---|---|
| 7,171,187 B2 * | 1/2007 | Haave | B60R 25/102 370/338 |
| 7,455,225 B1 * | 11/2008 | Hadfield | G07C 5/085 235/444 |
| 7,755,479 B2 | 7/2010 | Webb, Sr. | |
| 7,924,153 B1 | 4/2011 | Furey | |
| 8,009,086 B2 | 8/2011 | Grossnickle | |
| 8,223,009 B2 * | 7/2012 | Anderson | H04W 24/00 705/13 |
| 8,321,124 B2 | 11/2012 | Curatolo | |
| 8,760,274 B2 | 6/2014 | Boling | |
| 8,810,454 B2 | 8/2014 | Cosman | |
| 8,878,670 B2 | 11/2014 | Rosen | |
| 9,066,464 B2 | 6/2015 | Schmidt | |
| 9,094,022 B2 | 7/2015 | Sanderford, Jr. | |
| 9,185,517 B2 | 11/2015 | Kuhl | |
| 9,253,752 B2 | 2/2016 | Lee | |
| 9,456,301 B2 | 9/2016 | Thompson | |
| 9,462,357 B2 | 10/2016 | Westick | |
| 9,547,079 B2 | 1/2017 | Hyatt | |
| 9,549,287 B2 | 1/2017 | Baran | |
| 9,628,951 B1 | 4/2017 | Kolavennu | |
| 9,651,673 B2 | 5/2017 | Lacatus | |
| 9,654,924 B2 | 5/2017 | Jernigan | |
| 9,679,456 B2 | 6/2017 | East | |
| 9,686,743 B2 | 6/2017 | Lacatus | |
| 9,696,429 B2 | 7/2017 | Turon | |
| 9,746,333 B2 | 8/2017 | Barnard | |
| 10,416,280 B2 * | 9/2019 | Meadow | G01S 5/0072 |
| 10,495,764 B2 * | 12/2019 | Bastian, II | B65D 19/0055 |
| 2002/0158778 A1 | 10/2002 | Flick | |
| 2005/0200520 A1 | 9/2005 | Jesson | |
| 2006/0022867 A1 | 2/2006 | Hessing | |
| 2006/0202817 A1 | 9/2006 | Mackenzie | |
| 2007/0176771 A1 | 8/2007 | Doyle | |
| 2007/0247359 A1 | 10/2007 | Ghazarian | |
| 2008/0007398 A1 | 1/2008 | DeRose | |
| 2008/0191937 A1 | 8/2008 | Wisherd | |
| 2008/0224854 A1 | 9/2008 | Furey | |
| 2008/0246656 A1 | 10/2008 | Ghazarian | |
| 2009/0079565 A1 | 3/2009 | Mackenzie | |
| 2010/0141445 A1 | 6/2010 | Venkatasubramaniyam | |
| 2010/0185524 A1 | 7/2010 | Watkins et al. | |
| 2010/0235121 A1 | 9/2010 | Constien | |
| 2010/0311385 A1 | 9/2010 | Hurwitz | |
| 2010/0253508 A1 | 10/2010 | Koen | |
| 2010/0272262 A1 | 10/2010 | Boubion | |
| 2010/0315235 A1 | 12/2010 | Adegoke | |
| 2011/0047183 A1 | 2/2011 | Ford | |
| 2011/0148626 A1 | 6/2011 | Acevedo | |
| 2011/0020523 A1 | 8/2011 | Furey | |
| 2011/0285535 A1 | 11/2011 | Barwin | |
| 2012/0143397 A1 | 6/2012 | Mackay | |
| 2012/0235860 A1 | 9/2012 | Ghazarian | |
| 2012/0310854 A1 | 12/2012 | Cova | |
| 2013/0072223 A1 | 3/2013 | Berenberg | |
| 2013/0104035 A1 | 4/2013 | Wagner | |
| 2013/0127617 A1 | 5/2013 | Baade | |
| 2013/0321211 A1 | 12/2013 | Chakraborty | |
| 2013/0324151 A1 | 12/2013 | Lee | |
| 2013/0342394 A1 | 12/2013 | Leslie | |
| 2014/0074667 A1 | 3/2014 | Smith | |
| 2014/0095091 A1 | 4/2014 | Moore | |
| 2014/0164191 A1 | 6/2014 | Gafford | |
| 2014/0187261 A1 | 7/2014 | Lee | |
| 2014/0374478 A1 | 12/2014 | Dearing | |
| 2015/0057015 A1 | 2/2015 | Bertagna | |
| 2015/0077247 A1 | 3/2015 | Curatolo | |
| 2015/0095336 A1 | 4/2015 | Green | |
| 2015/0204974 A1 | 7/2015 | Pillay | |
| 2015/0223019 A1 | 8/2015 | East | |
| 2015/0271638 A1 | 9/2015 | Menayas | |
| 2015/0282364 A1 | 10/2015 | Moon et al. | |
| 2015/0296332 A1 | 10/2015 | Lee | |
| 2015/0364017 A1 | 12/2015 | Hall | |
| 2015/0369618 A1 | 12/2015 | Kuhl | |
| 2016/0049014 A1 | 2/2016 | Wells | |
| 2016/0054448 A1 * | 2/2016 | Woolf | G01S 19/14 342/357.52 |
| 2016/0066138 A1 | 3/2016 | Kuhl | |
| 2016/0105868 A1 | 4/2016 | Lee | |
| 2016/0116596 A1 | 4/2016 | Rajala | |
| 2016/0142099 A1 | 5/2016 | D'Amico | |
| 2016/0142881 A1 | 5/2016 | D'Amico | |
| 2016/0171433 A1 | 6/2016 | Dearing | |
| 2016/0180135 A1 | 6/2016 | Dearing | |
| 2016/0198294 A1 | 7/2016 | Bertagna | |
| 2016/0212586 A1 | 7/2016 | Ziskind | |
| 2016/0240018 A1 | 8/2016 | Shayovitch | |
| 2016/0286349 A1 | 9/2016 | Borghei | |
| 2017/0006419 A1 | 1/2017 | Rajala | |
| 2017/0023377 A1 | 1/2017 | Burtner | |
| 2017/0027981 A1 | 2/2017 | Casuscelli | |
| 2017/0039632 A1 | 2/2017 | Meagher | |
| 2017/0053234 A1 | 2/2017 | Lozito | |
| 2017/0082728 A1 | 3/2017 | Hyatt | |
| 2017/0148241 A1 | 5/2017 | Kerning | |
| 2017/0181100 A1 | 6/2017 | Kolavennu | |
| 2017/0195848 A1 | 7/2017 | Korneluk | |
| 2017/0195958 A1 | 7/2017 | Korneluk | |
| 2017/0230790 A1 | 8/2017 | Skomra | |
| 2017/0234931 A1 | 8/2017 | Moore | |
| 2018/0084388 A1 | 3/2018 | Askar | |
| 2019/0311596 A1 | 10/2019 | Valentino et al. | |
| 2019/0317223 A1 | 10/2019 | Czarnecky et al. | |
| 2020/0128482 A1 | 4/2020 | Daoura et al. | |
| 2020/0342774 A1 * | 10/2020 | Rowse | G09G 5/22 |

FOREIGN PATENT DOCUMENTS

| | | |
|---|---|---|
| CA | 2847766 A1 | 7/2015 |
| CN | 201765318 U | 3/2011 |
| DE | 102009041128 B4 | 7/2016 |
| GB | 2417118 A | 2/2006 |
| IN | 4843CHENP2015 A | 7/2016 |
| MX | 342096 B | 9/2016 |
| WO | WO0148505 A3 | 1/2002 |
| WO | WO2007109838 A1 | 10/2007 |
| WO | WO2011013084 A1 | 2/2011 |
| WO | WO2011116400 A1 | 9/2011 |
| WO | WO2011146770 A1 | 11/2011 |
| WO | WO2013078291 A1 | 5/2013 |
| WO | WO2014008752 A1 | 1/2014 |
| WO | WO2014197497 A9 | 1/2015 |
| WO | WO2015149107 A1 | 10/2015 |
| WO | WO2016164931 A1 | 10/2016 |

* cited by examiner

GPS TRACKING DEVICE WITH EXTENDED BATTERY LIFE

CROSS-REFERENCE TO RELATED APPLICATIONS

This application is a continuation-in-part of U.S. application Ser. No. 16/002,710, filed on Jun. 7, 2018, which claimed the benefit of U.S. Provisional Application No. 62/658,144, filed on Apr. 16, 2018, the contents of which are incorporated herein in their entirety by reference.

BACKGROUND

Global Positioning System (GPS) tracking devices with cellular modems have been used for many years to provide accurate geolocation and time information to users anywhere on or near the earth. Although originally created for military use, these devices can be used for a number of different purposes including fleet tracking, geofencing, data mining, robotics and athletics. Manufacturers and dealers can use them to maintain location regarding their inventory, pay lenders based on shipments and to provide valuable marketing data such as time and location of sales and delivery.

GPS tracking devices on boats, power sports, recreational vehicles and other assets (Assets) are not typically shipped with the Assets, but rather installed when it is being prepped after a consumer sale, so in order to use a GPS tracking device on boats, power sports, recreational vehicles and other assets, the GPS tracking device will require an internal battery to operate, and that can be continually optimized for extended battery life, because the boats, power sports, recreational vehicles and other assets may be in inventory from a few months to up to two years. Typical GPS tracking devices could drain an internal battery in a few days or weeks, so the ability to extend battery life to years is required. Additionally, the boats, power sports, recreational vehicles and other asset typically disconnect their battery that powers itself in the off-season during storage and again the need for a GPS tracking device will require an internal battery that can be continually optimized for extended battery in order to track and supply data about the boats, power sports, recreational vehicles and other asset while the Asset battery is disconnected. The ability to manage and extend that battery life is critical for any user to rely on the GPS tracking device to do their respective jobs.

SUMMARY OF THE INVENTION

A boat, power sport, recreational vehicle or other asset system for GPS tracking with extended battery life comprising a GPS tracking device with internal battery supply attached to the boat, power sport, recreational vehicle or other asset; an SaaS Application in communication with the GPS tracking device that determines which data to collect from the GPS tracking device, which data to distribute and a frequency of data transmissions required as the boat, power sport, recreational vehicle or other asset moves from a manufacturer to a consumer in a supply chain, and collects the data that the GPS tracking device sends through wireless, cellular, WIFI or Blue Tooth technology; firmware that communicates with the SaaS Application and the GPS tracking device and updates rules within a chip or board on the GPS tracking device that determines what data to collect, what data to distribute, when to send data, how often data is sent, when the GPS tracking device will wake up and when the GPS tracking device will sleep; and an accelerometer embedded in the GPS tracking device that determines whether the GPS tracking device is moving or stationary.

Additional embodiments include a boat, power sport, recreational vehicle or other asset system for GPS tracking with extended battery life comprising a GPS tracking device with an internal battery supply, attached to the boat, power sport, recreational vehicle or other asset during manufacturing; an SaaS Application that determines when to wake up and when to sleep, a type of data to collect, when to collect the data, a frequency of data transmissions required as the boat, or other power sport, recreational vehicle or asset moves from a manufacturer to a consumer and collects the data that the GPS tracking device sends through wireless, cellular, WIFI or Blue Tooth technology, and wherein the SaaS Application is configured to provide access to the data to consumers, manufacturers, dealers, distributors, banks, floor plan companies, insurance companies and others through the Web, smartphone apps, tablet apps and other devices user interfaces; rules associate with the GPS tracking device of when to wake up and when to sleep, the type of data to collect, when to collect that data, the frequency of data transmissions and the specific data that the GPS tracking device may send on a particular transmission, wherein the rules are embedded in the firmware within a chip or board in the GPS tracking device that is sent over the air (OTA) wirelessly to the GPS tracking device and is updated on the GPS tracking device; firmware that contains the rules associated with the GPS tracking device; Firmware Management Software that ingests the rules created by the SaaS Application along with its own rules and creates firmware for the GPS tracking device; and wherein the presence of a Geo Fence boundary is determined by comparing location data against map data; a number and frequency of data transmissions provided by the GPS tracking device is modified based on the presence of a Geo Fence, movement of the GPS tracking device and location of the GPS tracking device; manufacture attributed data related to the boat, power sport, recreational vehicle or other asset is provided to the SaaS Application; data is gathered related to time and location of sales and delivery among other data; and the gathered and augmented data is provided to manufacturers, dealers, floor plan companies, insurance companies, or others through the user interfaces that consist of website and apps for the smart phone, tablets and other devices of the SaaS Application.

BRIEF DESCRIPTION OF THE DRAWINGS

Example embodiments of the present general inventive concept will become more clearly understood from the following detailed description of the present general inventive concept read together with the drawings in which.

DETAILED DESCRIPTION

Figure 1:
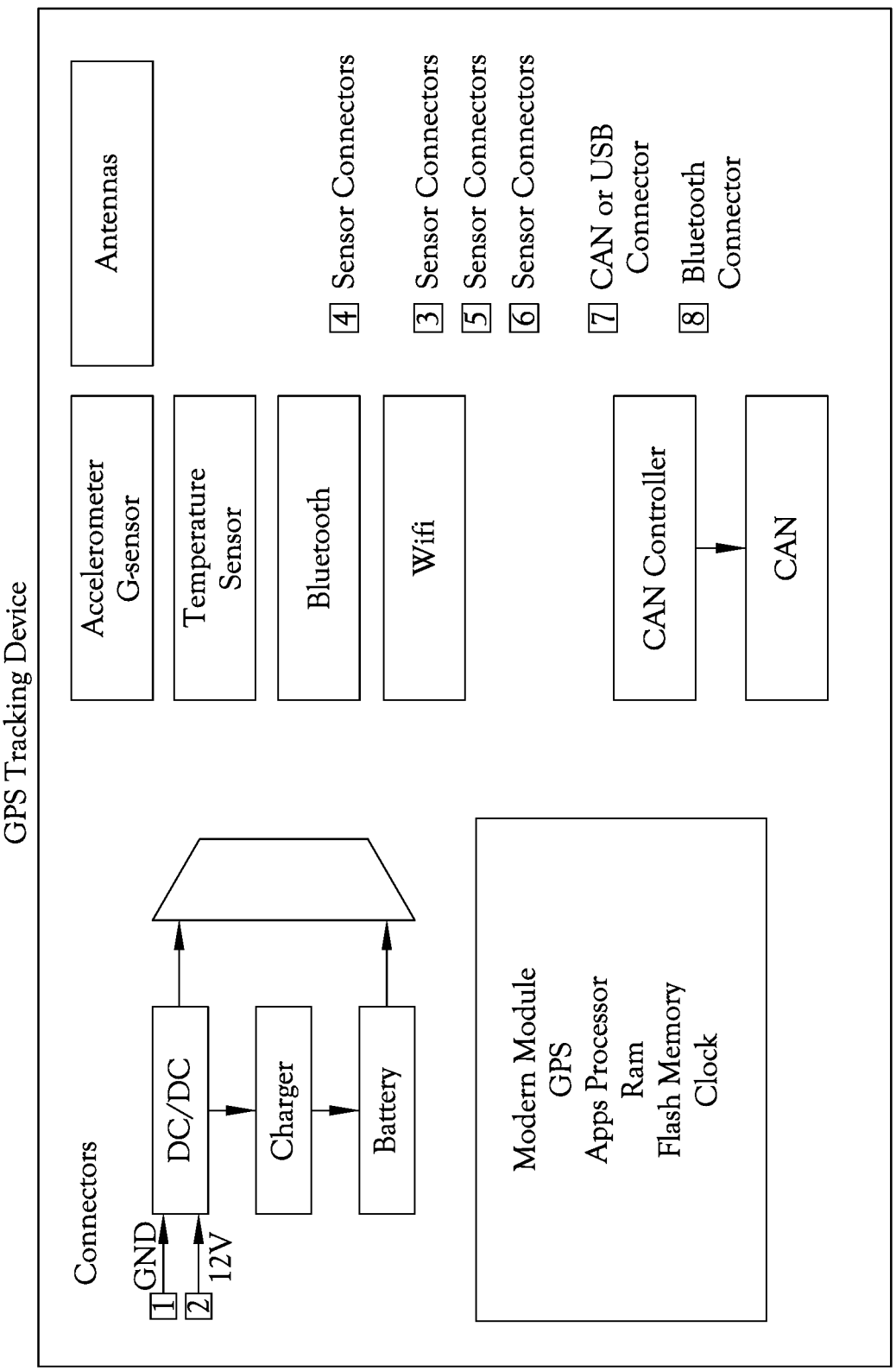
FIG. 1 is a schematic diagram of one embodiment of the GPS tracking device.

Reference will now be made to the example embodiments of the present general inventive concept, examples of which are illustrated in the accompanying drawing(s) and illustration(s). The example embodiments are described herein in order to explain the present general inventive concept by referring to the figure(s). The following detailed description is provided to assist the reader in gaining a comprehensive understanding of the structures described herein. Accordingly, various changes, modification, and equivalents of the structures and techniques described herein will be suggested to those of ordinary skill in the art. The descriptions are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

When used by manufacturers or dealers to track boats, power sports, recreational vehicles or other assets, there are certain Asset states where it is not as critical for the GPS tracking device GPS tracking device to constantly send position transmissions. For example, where the Asset is located within a physical or Geofence location on the manufacturer's site or is located at a dealer location prior to sale, then limited transmissions would be acceptable since it is assumed that there would be little to no movement of the Asset within these locations, thus saving internal battery life. A GPS tracking device attached to an Asset, which includes a system for enhancing the battery life of the GPS tracking device would be beneficial, allowing the GPS tracking device to run for a longer period of time, limiting the need for battery replacements. The frequency of data transmissions or pings will be dependent on the location of the GPS tracking device and whether it is in motion, and the rules created by software that determine what data to collect, when to sleep and wake up, when to send the data and what other functions to perform and save on the GPS tracking device internal boards.

Additionally, this GPS tracking device may sense when the Asset's battery is connected and powering the Asset, and then switches to using the Assets battery as opposed to the GPS tracking device internal battery. This saves power on the internal battery of the GPS tracking device. The GPS tracking device senses when the Assets battery is disconnected and switches back to using the GPS tracking device internal battery, so no power is lost to the GPS tracking device. This allows the GPS tracking device to constantly have power when an Asset is stored out of season with its battery disconnected and fully operated. Such a GPS tracking device can be tied to specific manufacture data such as date, model, color, accessories, and engine details, just to name a few, and data can be gathered regarding time and location of sales and boat delivery. This data, along with data coming from the GPS tracking device is mined and augmented to provide inventory control and other important marketing information in real time, and predictive analytics to manufacturers, distributors/dealers, banks, insurance companies, service companies, suppliers, consumers to name a few, to perform their services more accurately and timely.

Embodiments of the present general inventive concept provide a boat, power sport, recreational vehicle or other asset system for GPS tracking with extended battery life comprising a GPS tracking device with an internal battery that is attached to the Asset; software as a service (SaaS) application that queries, commands and receives data from the GPS tracking device that determines a frequency of data transmissions required, and other rules as the Asset moves from a manufacturer to a consumer and collects the data that the GPS tracking device sends through wireless, cellular, WIFI or Blue Tooth technology and wherein the SaaS Application user interface is configured to provide access to the data to consumers, manufacturers, dealers, distributors, banks, floor plan companies, and insurance companies and others.

The rules of the frequency of data transmissions and the specific data that the GPS tracking device should send on a particular transmission is embedded in the firmware and sent wirelessly over the air (OTA) to the GPS tracking device and is updated on the GPS tracking device. Firmware is software instructions used to tell an electronic device how to operate. The firmware contained in these devices provides the control program for the device, one of which determines how often data is sent from the GPS tracking device to the SaaS Application; and an accelerometer attached to the GPS tracking device that determines whether the GPS tracking device is moving or stationary.

The SaaS Application allows for only authorized, dealers, distributors, Floor plan companies or banks, etc., for a particular manufactured brand, to access the user interface apps. In addition, the SaaS Application allows for users in the industry to share certain data and information regardless if you are an authorized dealer or not.

Example embodiments of the present general inventive concept can be achieved by providing a boat, power sport, recreational vehicle or other asset method for GPS tracking with extended battery life comprising manufacturing a boat, power sport, recreational vehicle or other asset; attaching a GPS tracking device with internal battery supply to the Asset during manufacturing or at the distributor/dealer; providing sensors built in the GPS tracking device to run the GPS tracking device off of the Asset's battery or the GPS tracking device internal battery; providing an SaaS Application that queries and commands the GPS tracking device that determines a frequency of data transmissions required, actions to perform and the data to send of the GPS tracking device that are unique for each circumstance or company that physically possess the Assets as it moves through the supply chain from the manufacturer to the consumer.

The SaaS Application updates the rules and sends the rules changes to the Firmware Management Software that in turn creates the firmware. The firmware is sent over the air (OTA) to the GPS tracking device. The firmware updates the rules and operation of the GPS tracking device to optimize the battery life among other things, based on the rules and instructions for each instance; The GPS tracking device detects things like the presence of a Geo Fence boundary by comparing location data against map data, modifying a number and frequency of data transmissions, when to go asleep and when to wake up, provided by the GPS tracking device based on the presence of a Geo Fence, movement of the Asset through the GPS tracking device and location of the Asset GPS tracking device. The SaaS Application queries and commands the GPS tracking device, mines other data received from the GPS tracking device, and other data to analyze the battery life and make appropriate rule changes and start the cycle over again to optimize battery life, providing the taxonomy and ontology that defines data attributes and attribute values.

Attribute values are collected, created, augmented and normalized to provide the entire Asset configuration complete with options and accessories. Examples of these attributes and attribute values in the taxonomy may include: serial number/MCS 892k39920, year/2105, make/Mastercraft, model/Prostar, color/red, size/20'3", weight/3100 lbs, horse power/425, including accessories and options; gathered sensory data, experiential data, sensory telemetry, GPS tracking device and data related to time and location of the Assets through the GPS tracking device throughout the supply chain including sales and delivery of the Asset; external data, personal information, events, weather overlays, and banking information into the SaaS Application; providing statistical, diagnostic, predictive and prescriptive analytics, alerts and reports through the SaaS Application user interfaces on the web and smartphone and tablet apps; toto manufacturers, distributors/dealers, banks, floor plan finance companies, insurance companies, service companies, suppliers consumers and others.

In many cases, boats, power sports, recreational vehicles as well as a wide variety of other assets are not equipped with starting or batteries that power the Asset by the manufacturer and must be added by the dealer when prepping the Asset for delivery to the consumer. Since these Assets can sit in inventory for months and up to several years, there is a need for the GPS tracking device to have an internal battery and it is essential to operate. The ability to manage and extend that battery life is critical for any user to rely on the GPS tracking device to do their respective jobs.

The GPS tracking device may include an internal, low self-discharge, temperature stable, lithium thionyl chloride battery supplying power to the device. When the external 12 v power and ground (GND) are connected to the Assets 12 v power supply (such as a starting battery), the device automatically disconnects itself from its internal power supply and switches over to the Asset's 12 v power, preserving the internal battery life to be used again in the event that 12 v power is disconnected, or the 12 v source of power drains below an operable threshold. This preserves the GPS tracking devices ability to operate independently of an external source of power. The GPS tracking device is equipped with an Apps Processor that manages communication through various wired and wireless communication options (depending on availability). The Processor communicates with an internal clock that supplies the date and time information of various events such as transmissions and updates to the SaaS Application. Random Access Memory (RAM) provides the operating system memory and can be updated with new instructions through the SaaS Application. Flash Memory is onboard to provide data storage (a cache) between transmissions.

A 3-axis accelerometer (or 6 to 9 axis accelerometers in some applications) is onboard to detect and assign a value to Asset movement. Depending on the movement detected and the force involved, the device may respond according to the instructions provided by the firmware. A simple example is that accelerometer movement will trigger the device to wake up, collect data from all onboard sensors and send a report to the SaaS Application. A temperature sensor measures temperature data, which is reported to the SaaS Application with each report and is used to trigger certain notifications associated with programable temperature thresholds. A GPS satellite module supports identification and triangulation with GPS satellites. The GPS tracking device is utilized to determine Asset location. A cellular modem transceiver connected to an internal antenna is onboard and identified by a unique International Mobile Equipment Identity (IMEI) number associated with a SIM card (or eSIM technology) to support over-the-air communication through cellular infrastructure to the SaaS Application. In addition, the cellular modem may be used to provide location services by using triangulation between the device and available cellular towers. This is beneficial when the Asset does not have a clear view of the sky such as when the Asset is under a roof. A Bluetooth® module on the device may connect to various Bluetooth® enabled devices to manage a variety of short-range communications. A Wi-Fi module allows the GPS tracking device to connect to available Wi-Fi networks to manage connectivity with the SaaS Application. Both Bluetooth® and Wi-Fi can be used to assist in Asset location in storage situations where a series of beacons are set up and available. Assets equipped with a Control Area Network (CAN) can be connected to the device via a CAN connector, USB connector, Bluetooth® or cellular network to allow access and programing of CAN managed control modules. This enables remote access to data communicated through the CAN for remote troubleshooting and even the capability to send software patches and upgrades through the CAN. External sensors may be connected to the device to provide sensor data to be processed through the SaaS Application.

According to various examples of the present general inventive concept, a GPS tracking device and system, attached to a boat, power sports, recreational vehicle or other asset, with enhanced battery life includes a Saas Application to monitor the status of the GPS tracking device internal battery and determine the intensity of the tracking information desired as the Asset and GPS tracking device is moved from the manufacturer to the consumer. The GPS tracking device is mounted within an Asset on the assembly line or in the field at such location as a dealer, for example, and is carried on the boat from the manufacturer to the dealer and ultimately to the consumer. Firmware is sent to update the rules on the chip or board on the GPS tracking device which controls how often the data is sent from the GPS tracking device to the SaaS Application. Additionally, the SaaS Application can alter how often the GPS tracking device sends position data transmissions. The time interval between position data transmissions from the GPS tracking device will vary depending on the location, movement, presence of a geofence, and other factors, in order to conserve battery power. The GPS tracking device includes an accelerometer to determine whether it is moving or stationary.

Movement of the Asset with the GPS tracking device attached to the Asset, coupled with SaaS Application that communicates with the GPS tracking device, can further provide marketing information. For example, the GPS tracking device may be associated with the manufacturers attribute values of a specific Asset like, date, model, accessories, color, engine details, just to name a few, and data concerning the Asset and can gather data regarding time and location of sales and Asset delivery. This attributed data from the manufacturer may be collected, created, normalized and augmented in the SaaS Application database using a taxonomy and ontology that has been created for this purpose. This attributed data, along with data coming from the GPS tracking device is be mined and augmented to assist in providing inventory control and other important marketing information in real time, and predictive analytics to manufacturers, distributors/dealers, banks, insurance companies, service companies, suppliers, consumers, to name a few, to perform their services more accurately and timely. This data can be mined and augmented to assist in providing inventory control which may include information as to how long the Asset stays on the dealer's lot, when it is sold, and such information can be used as feedback to the manufacturer to assist in determining the type, color, length and other characteristics of Assets or other Assets which are moving quickly and are more desirable. This type of marketing data collected by the GPS tracking device can be provided to a manufacturer, dealer, floor plan companies, insurance companies, and others.

Similarly, the GPS tracking device can be used to track information of the Asset once the Asset is transferred to the consumer. The information might include how the Asset is being used by the consumer, by whom, time periods, and locations, and can be used to track maintenance requirements, for example. This type of information can be valuable for the manufacturer, dealer, insurance company, among others.

Other examples of rules the system creates to extend the battery life GPS tracking device may include the following. When the GPS tracking device is installed on a boat, the system compares the location and the GeoFence and determines the Asset is in the manufactures lot. The GPS tracking device knows to go to sleep and wake up once a day to give its location to the SaaS Application. The SaaS Application shows the location of the Asset on a map through the apps to the users. If the Asset is moved, it will wake up immediately and send its location every minute until the Asset stops moving as long as the Asset is within the manufacturer's GeoFence and then go back to sleep. The SaaS application sends out an alert that this specific Asset is moving and then stopped and an exception report will be sent to the users through the SaaS Application. If the GPS tracking device is turned in a certain series of directions, without authorization, then it will wake up and send an alert to users through the SaaS Application apps and stay awake and send location every minute so the manufacture knows the GPS tracking device is being tampered with. If the Asset is moved outside the GeoFence without authorization, it will wake up and send location every three minutes. An Alert notification can be sent to the users through the SaaS Application that the Asset is being stolen and report the authorities. The users can track where the Asset is moving to for recovery. The users in this instance could be several different users within the manufacture, the police and/or the insurance company and a recovery company. Based on the data that the GPS tracking device sends to the SaaS Application, along with the attributes of that specific boat and external data, the SaaS Application may determine that model A boats that are red and parked within thirty feet of the south fence get moved on average of five times a day for the first two weeks because that location signifies that these specific boats are still having parts added to them. In this instance the SaaS Application will write new rules and the Firmware Management Software will send the updated firmware to the GPS tracking device on those specific boats to change the rules on the GPS tracking device. The new rule will be to wake up during movement, but if your location is within thirty feet of the south fence, do not report the movement unless the Assets leave the GeoFence, record the movement in memory and go back to sleep. This may be repeated for each movement during the day. At the end of the day before 9 pm, wake up and send all of the movement history to the SaaS Application for the users to see on the apps. This will save considerable battery power by waking up and going to sleep instead of keep sending location data every few minutes. The GPS tracking device uses the most power when sending the data over the wireless carriers, so by saving the information and actually sending it only once a day will save battery power. Most importantly, by learning patterns and changing the rules, additional battery saving is made, thus extending the battery life.

In other embodiments, the GPS tracking device wakes up and sends location when moved and senses that the Asset is moving at a certain speed and location and this information is sent to the SaaS application and it is determined that is being transported from the factory to the dealer over the road. The GPS tracking device rules may specify that the location and speed will be sent every fifteen minutes when the speed is over 25 mph and then stop. It may report when the Asset has stopped for more than thirty minutes and then go to sleep. This obviously saves the internal battery power and extends battery life. The SaaS Application will analyze the data sent from the GPS tracking device along with external data such as routes, weather etc, and may determine to change the speed and frequency of the location reporting while in transit to optimize and extend battery life. The rules will be created and the firmware sent to the GPS tracking device to be updated as described in more detail in this document.

In an additional embodiment, the Asset with the GPS tracking device is located within a dealers GeoFence and in the showroom. The GPS tracking device may sense a slight shaking and determines that someone has climbed on the boat. The GPS tracking device wakes up, reads the ID of mobile phone through its Bluetooth. It recognizes the ID as an employee of the dealership and a user of the SaaS Application app, gathers data, stores the data in its memory and goes back to sleep. If the ID of the mobile phone is not an employee, it may stay awake and gather more information, like temperature, how long the vibration occurs, if there is more than one phone ID, if a known employee phone ID is within range, and will continue to gather data until the motion stops. It will then send the data immediately to the SaaS Application and go to sleep. As it is learned who the employees are, the GPS tracking device will save battery power and extend the life of the internal battery. If the boat senses the same vibrations, but the boat is in the service bay, it will wake up, mark the time and go back to sleep. The process of the SaaS Application learning from the GPS tracking device and ultimately the GPS tracking device rules update, as described in more detail within this document, saves battery power and extends battery life. The SaaS Application will analyze the data and report to the user information about the demo and the specific attribute values of that boat and aggregate the data from demos and can create reports that can show for example that boats in this location of the showroom and of this type of boat are demoed 52% more often, and that wake board boats of 23'-25' length, in red with a 425 hp engine, with a wakeboard tower, with 4 speakers are being demoed 41% more often with a 63% higher rate of purchase when they demoed in the boat for more than 45 minutes.

In an additional embodiment, a consumer owns a boat that has been winterized and the boat's starting battery has been disconnected and is in storage during the winter months. The GPS tracking device with an internal battery offers many conveniences for the owner, dealer and manufacture. First, the owner can monitor the location of the boat. The GPS tracking device wakes up during movement and if the boat is moved outside the owners GeoFence, it may immediately send alerts to the SaaS Application and to the owner through the app that the boat may be stolen. Authorities may also be alerted. It will continue to send locations every 3 minutes until recovered. Once the battery reaches a level of 25% power, it will slow sending the locations to once every 30 minutes until recovered. This allows time to locate the boat before the internal battery runs out of power. The SaaS Application may analyze the data and determine that in colder weather below fifteen degrees, the battery levels are dropping 20% faster. The GPS tracking device ultimately receives the rule changes, as further described in detail in this document, and now sends location every 45 minutes until recovered to save more battery power and give a better change of recovery of the stolen boat.

In addition, because the boat has the GPS tracking device with an internal battery, the dealer and owner can monitor the temperature to make sure the boat has been properly winterized for that temperature. The manufacture and dealer can send software updates to the engine and boat equipment in off hours, while data rates are cheaper, while the boat is in storage. The manufacture and dealers do not have to wait until Spring to send software to update the engines and equipment especially if it is critical to the safety of the boat. The GPS tracking device can be sent rules to wake up at a certain time to receive these software updates from the manufacture and dealers instead of having to be awake and listening all the time, saving an immense amount of battery power. Without this system's ability, the manufacturers and dealers software updates would not be possible with internal batteries in other GPS tracking devices with internal batteries, nor boats that leave their started batteries connected in the winter storage months because a GPS devices uses so much power when they are on sending and listening all the time.

FIG. 1 represents a schematic diagram of an embodiment of a GPS tracking device, which includes an internal battery supplying power to the device. Sensors #1 & #2 represent the connection points for positive and negative wires connecting power from the Asset battery to the GPS tracking device. The Apps Processor manages communication through various wireless communication options. The Apps Processor can communicate with an internal clock that supplies the date and time information of various events. Random Access Memory (RAM) provides the operating system memory. Flash Memory is onboard to provide data storage (a cache) between transmissions. A multi-axis accelerometer is onboard to detect and assign a value to Asset movement. A temperature sensor measures temperature. A GPS satellite module supports identification and triangulation with GPS satellites. A cellular modem transceiver is connected to an internal antenna. A Bluetooth® module may be provided to connect to various Bluetooth® enabled sensors or devices to manage a variety of short-range communications. A Wi-Fi module allows the device to connect to available Wi-Fi networks. Assets equipped with a Control Area Network (CAN) can be connected to the device via a CAN connector, USB connector, Bluetooth® or cellular network. External sensors may be connected to the device to provide sensor data to be process through the SaaS application.

Figure 2:
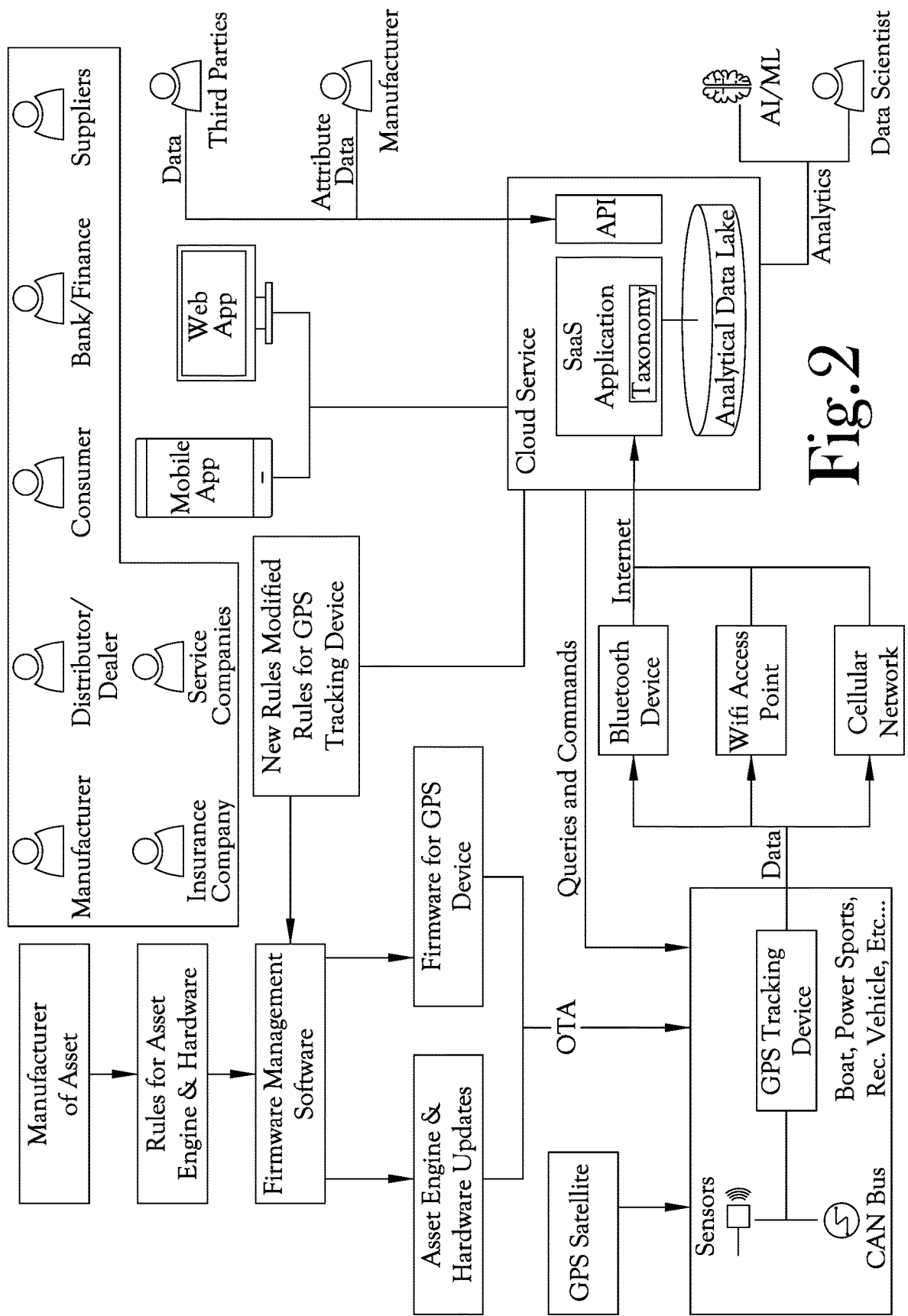
FIG. 2 is a diagram of the GPS tracking device system including the SaaS Application and Firmware Management System.

FIG. 2 represents a diagram of the system for the GPS tracking device including the manufacturer of boats, power sports vehicles, recreation vehicles and other assets provide the Asset attribute values that flow into the taxonomy, and the Firmware management Software that creates the firmware that flows to the GPS tracking device as well as hardware modules that exist on the Asset and engine, for example the Engine Control Module (ECM) for engine and hardware updates on the Asset. The GPS tracking device communicates with the GPS Satellites that provide location coordinates to the GPS tracking device. The GPS tracking device tracks the location of an Asset and provides OTA firmware update capabilities for modules that exist on the Asset for example, ECM and display. It then attaches to other sensors on the Asset, and collects data from the sensor based on the rules from the firmware. Based on the rules, the GPS tracking device sends the data through wireless carriers, Bluetooth, WIFI or any other method to access the internet to the SaaS Application. The SaaS Application resides on the AWS cloud services or on other cloud services such as Microsoft Azure or Google Cloud. The SaaS Application provides the core capabilities in the database to support the ontology and taxonomy, the user interfaces of mobile applications and web applications, rules engine and analytical data store. The Analytical Data Lake or the data store that persists data from users, GPS tracking devices and Assets can then be mined for analytical purposes. The proprietary taxonomy and ontology with attributes resides in the database of the SaaS Application to gather, create and normalize data into attribute values for each specific boat, power sport, recreational vehicle or other asset. Additional data, like weather, from outside third parties can be ingested into the SaaS Application. The user interfaces such as the Mobile App is in an application that users can run on their mobile devices to interact with the SaaS application. The Web App is an application that users can run on a web browser to interact with the SaaS application. The SaaS application can send queries and commands to the GPS tracking device through Wireless, Bluetooth, WIFI or any other method to connect through the internet. The SaaS Application creates and sends the rules and instruction to the Firmware Management Software to create the firmware to be sent to the device. In an additional embodiment, the SaaS Application and the Firmware Management Software can be one combined software application that can combine all of the functions of both into one software application.

Figure 3:
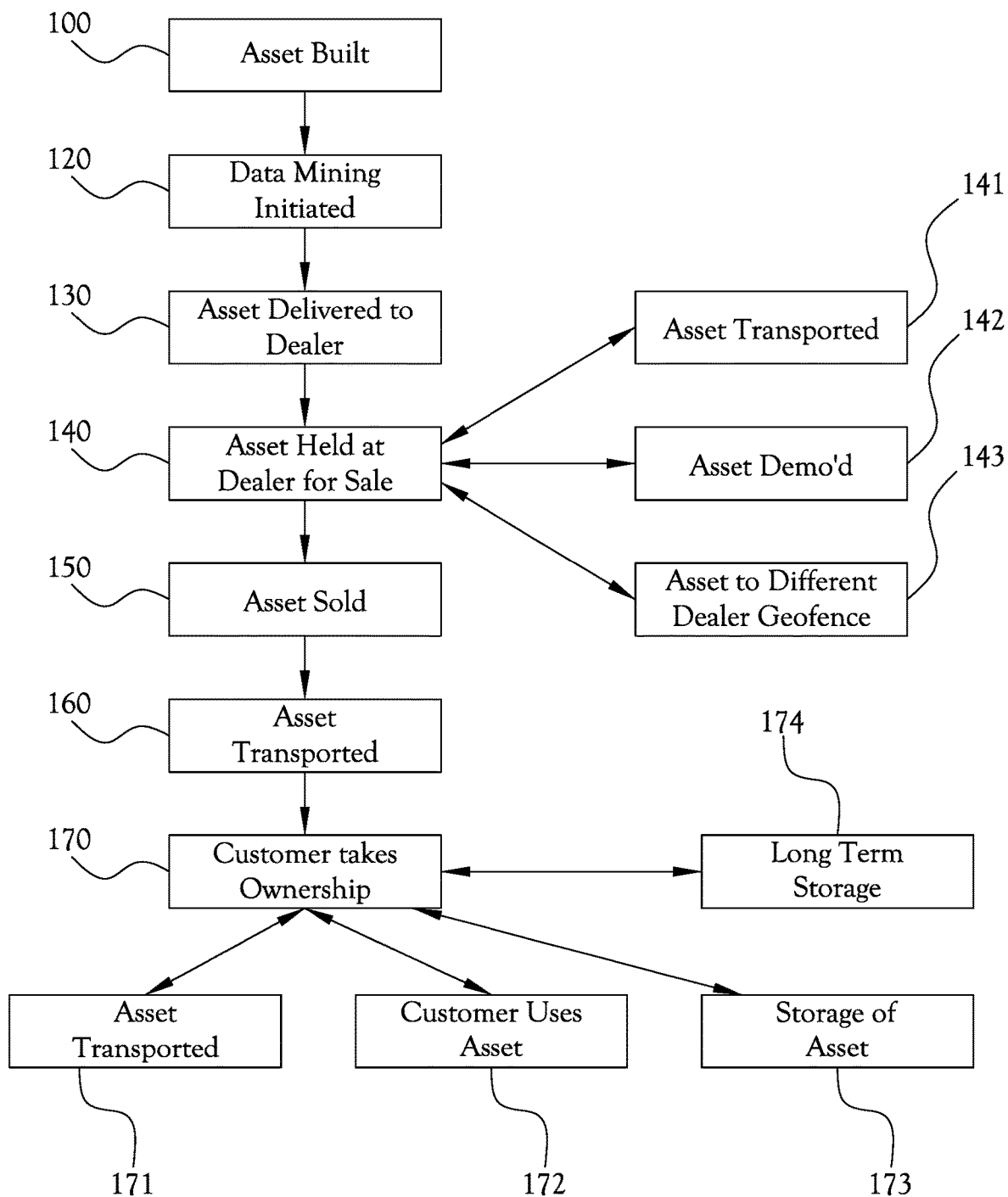
FIG. 3 is a flow diagram showing a top level view of the GPS tracking device as the Asset flows through the supply chain from manufacture to customer.

FIG. 3 represents a top level view of the various phases during usage of the GPS tracking device and system. In the first step of the use of the GPS tracking device, the Asset is built by the manufacturer 100, with the GPS tracking device installed on the Asset. In the next step after the build, data mining is initiated 120. Data mining then continues indefinitely once the GPS tracking device is installed and made available to the different companies along the way, as well as during ownership by the consumer. Next, the Asset is delivered to the dealer 130. The Asset is then held at the site of the dealer 140 for sale to the public. During this step, the Asset may be transported 141 or made available to a potential purchaser by demo 142. Additionally, the Asset may be held within a Geofence at the dealer's site or transferred to an alternative Geofence location 143 by the dealer. In the next step, the Asset is sold to a consumer 150. The Asset is then transported to the consumer 160 and the consumer then takes ownership of the Asset 170. As pointed out above, data mining activities continue to take place, and the results of this data can be provided to other dealers and manufacturers. During the ownership of the Asset phase, the Asset may be transported 171 or the consumer may use the Asset 172. Additionally, the Asset may be stored 173, for example, at the consumer's place of residence, or the Asset may be held within a long term storage facility 174.

Figure 4:
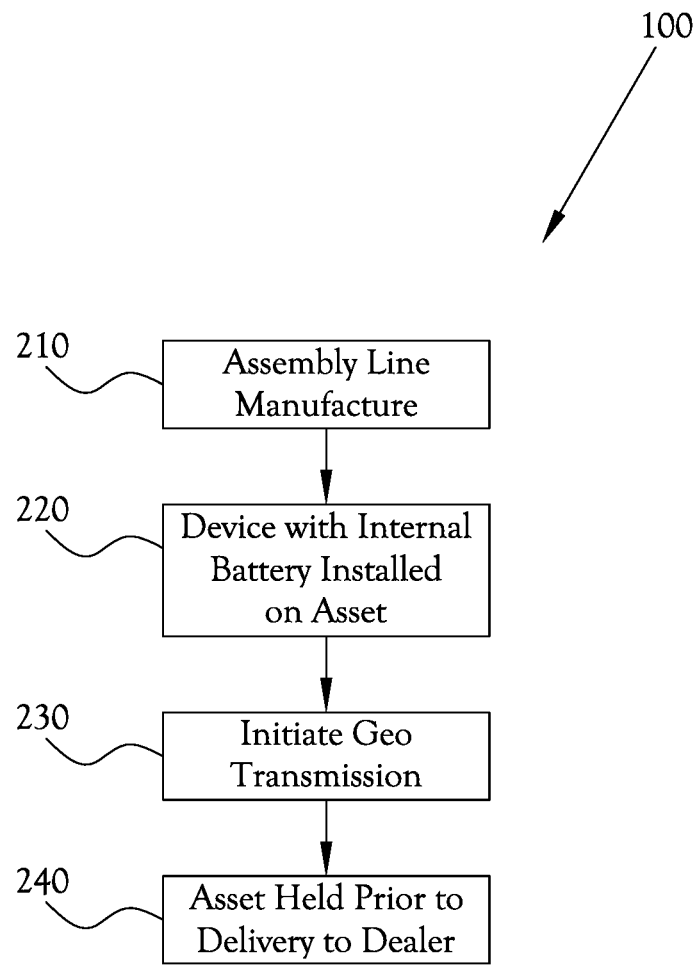
FIG. 4 is a flow diagram showing the Asset built step.

FIG. 4 represents the Asset built step of FIG. 1. The steps associated with the Asset built step include assembly line manufacture of the Asset 210, GPS tracking device with internal battery being installed on the Asset 220, initiation of the Geo Transmission mode 230, and the Asset being held prior to delivery to the Dealer 240. FIG. 4 represents one embodiment of the present invention, as the GPS tracking device can be installed at any point during the process. Once the GPS tracking device is installed on the device, then data mining can commence. FIG. 3 shows the data mining commencing immediately after the Asset built phase, in order to capture the data during this phase.

Figure 5:
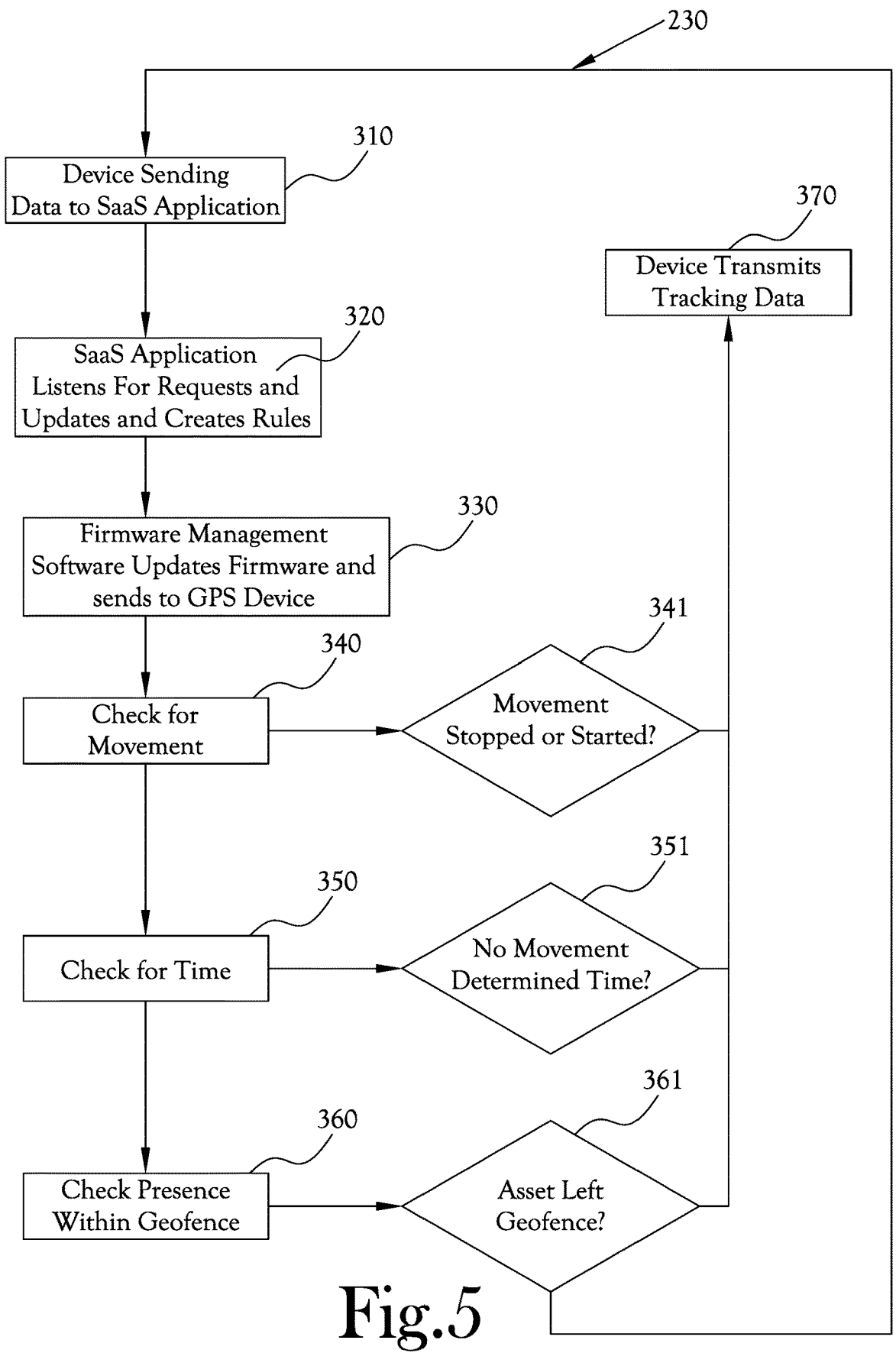
FIG. 5 is a flow diagram showing stages of the process while the GPS tracking device is in the Geo Transmission mode.

FIG. 5 represents the stages of the process while the GPS tracking device is in the Geo Transmission mode shown in FIG. 4. Since the GPS tracking device will be located within a Geofence during this step, full transmission mode will not be required. In the first step shown, the GPS tracking device is constantly sending data to the SaaS Application 310 at a rate controlled by instructions from the firmware within the chip on the GPS tracking device. While the GPS tracking evice is sending data, the SaaS Application listens for requests for position data transmissions from the GPS tracking device and updates and created new rules 320. Additionally, the firmware that is sent to the GPS tracking device can be updated 330 by the Firmware Management Software so that the firmware is set to send the data in different intervals based on the location, activity and sensors on the GPS tracking device. Next, the GPS tracking device checks for movement 340 using an accelerometer. If the GPS tracking device detects that movement has stopped or started 341, the GPS tracking device transmits tracking information 370. Next, the GPS tracking device checks the time durations 350 using its internal clock. If there has been no movement within a specified time frame 351, then the GPS tracking device transmits tracking information 370. Finally, the GPS tracking device checks the presence of the GPS tracking device within a Geofence 360. If the GPS tracking device has left the Geofence 361, then the GPS tracking device transmits tracking information 370 and the mode changes to one of the other modes described below. If the GPS tracking device determines that it is still within the Geofence then the process repeats itself within a loop.

Figure 6:
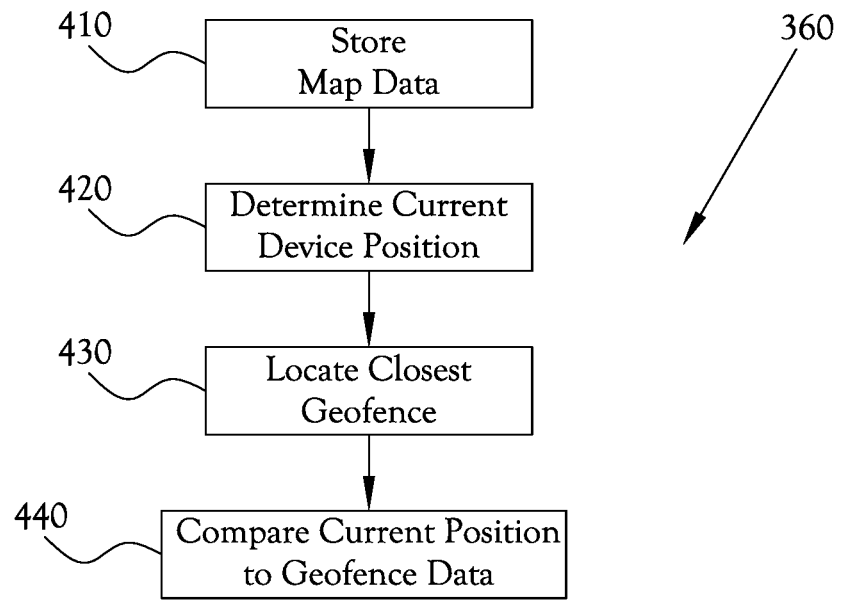
FIG. 6 is a flow diagram showing check presence with a Geofence step.

FIG. 6 represents the check presence with a Geofence step of FIG. 3. In the first step, the GPS tracking device stores map data 410. Then the GPS tracking device determines its current position 420. In the next step, the GPS tracking device locates the closest Geofence 430. Finally, the GPS tracking device compares its current position to the Geofence data 440.

Figure 7:
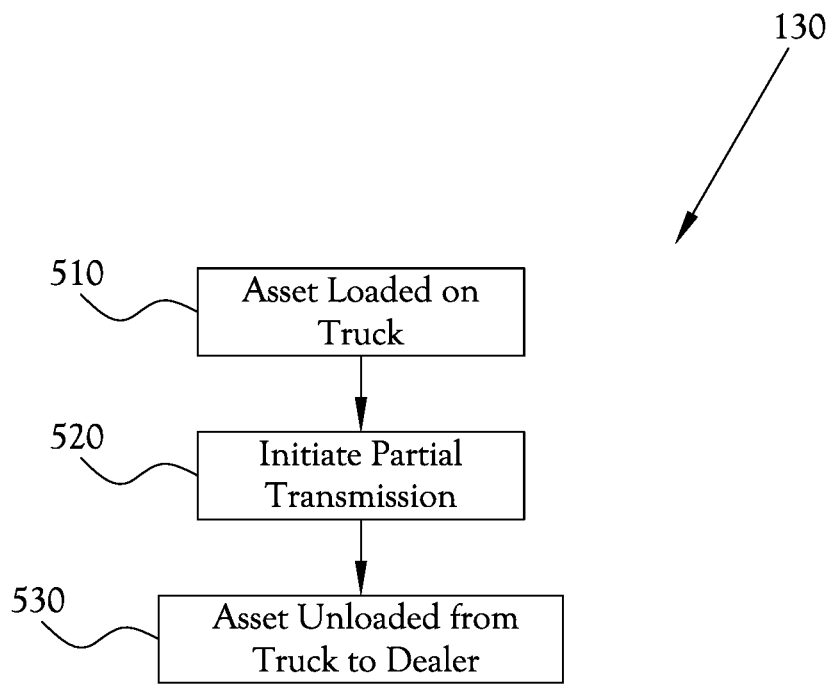
FIG. 7 is a flow diagram showing the Asset delivered to dealer step.
Figure 8:
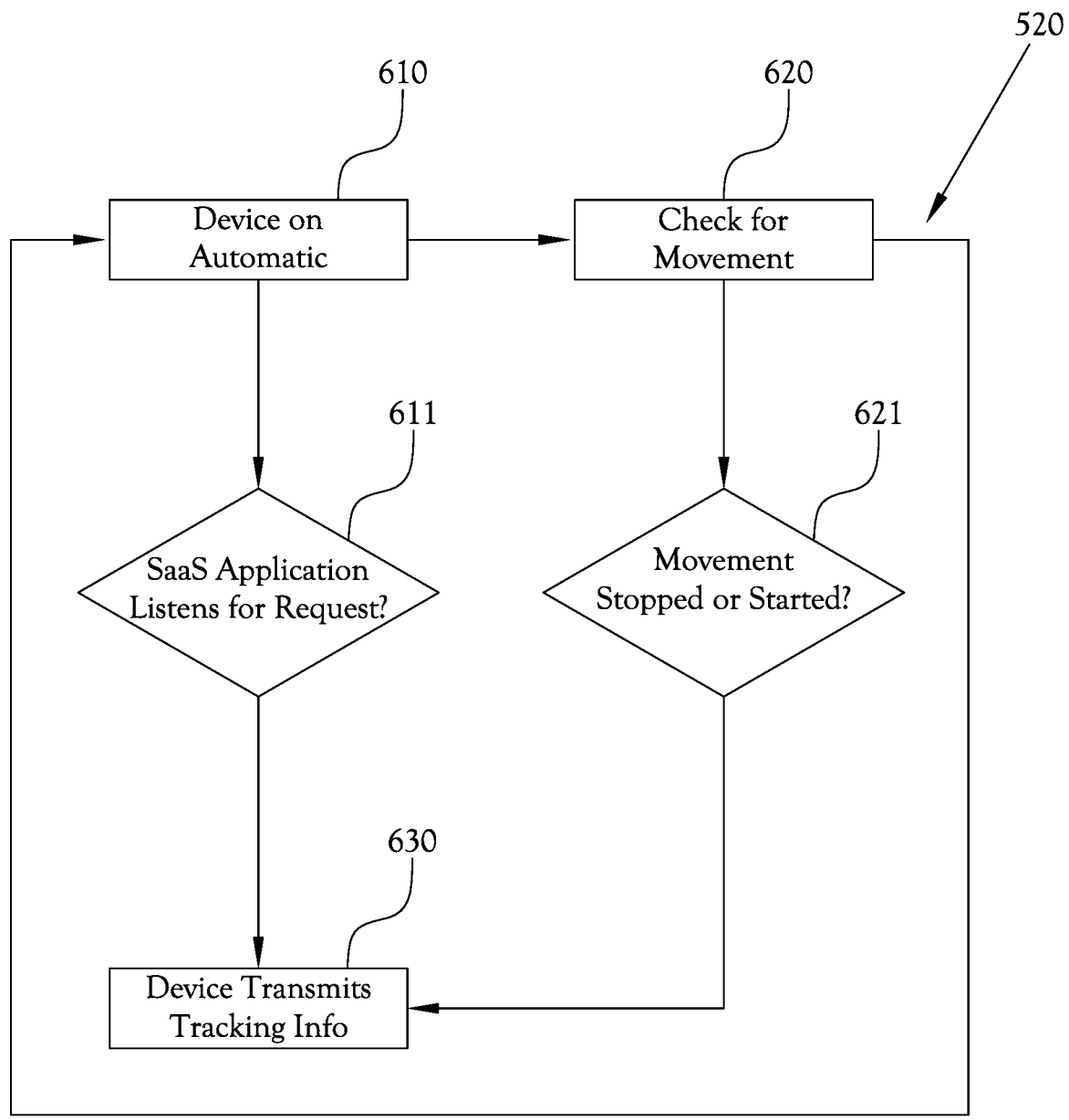
FIG. 8 is a flow diagram showing stages of the process while the GPS tracking device is in the partial transmission mode.

FIG. 7 represents the Asset delivered to dealer step of FIG. 3. The Asset is first loaded on a truck 510 or other transportation device. Then the GPS tracking device initiates partial transmission mode 520. Finally, the Asset is unloaded from the truck or other transportation device, and possession of the Asset is assumed by the dealer 530. FIG. 8 represents the stages of the process while the GPS tracking device is in the partial transmission mode shown in FIG. 7. During the Asset delivered to dealer step of FIG. 7, the need for position data transmissions is at its most minimal point since the Asset is in transit within the controlled confines of a carrier. In the first step, as previously shown in FIG. 5, the GPS tracking device is automatically sending data 610, while the SaaS Application listens for requests for position data transmissions from the GPS tracking device 621. Next, the GPS tracking device checks for movement 620 using an accelerometer. If the GPS tracking device detects that movement has stopped or started 621, the GPS tracking device transmits tracking information 630. The process then repeats until the Asset has reached its destination.

Figure 9:
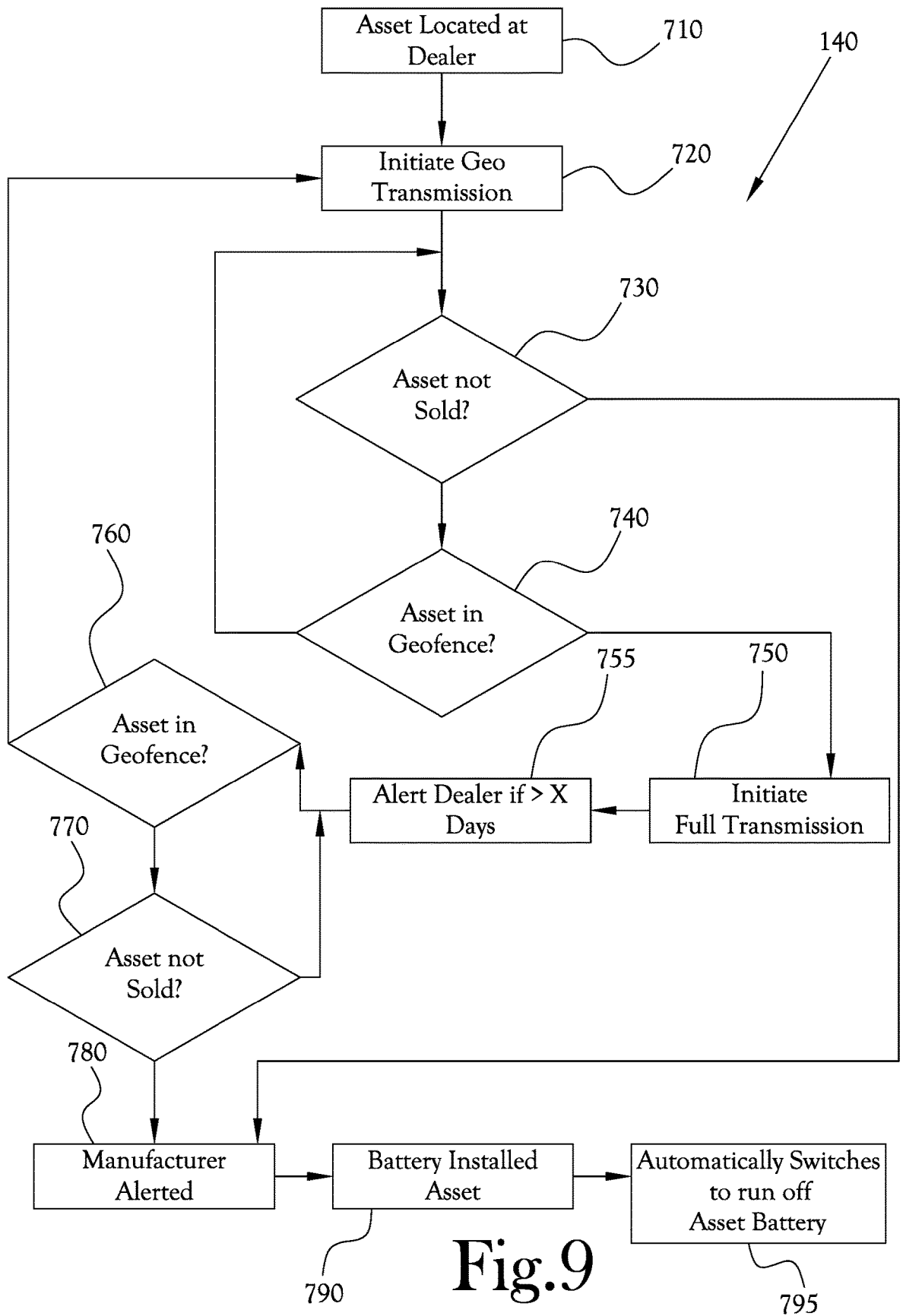
FIG. 9 is a flow diagram showing the Asset held at dealer for sale step.

FIG. 9 represents the Asset held at dealer for sale step shown in FIG. 3. Initially, the Asset has reached its location at the dealer site 710. At this point, the GPS tracking device initiates Geo Transmission mode 720. The following step then repeats until the Asset has been sold 730. If the Asset is located within a Geofence at the dealer's site 740, the process repeats to determine sale to a consumer. If the Asset has left the Geofence, the status is updated. The GPS tracking device then initiates full transmission mode 750. If the Asset is outside the Geofence for more than a specified number of days, then the dealer is notified 755. The GPS tracking device then determines whether the Asset has returned to the Geofence 760. If it has, then the status is updated, and the GPS tracking device once again initiates Geo Transmission mode 720 and the process repeats. If the GPS tracking device determines the Asset has not returned to the Geofence, then the GPS tracking device queries whether the Asset has been sold 770. If sold, the process exits the loop and continues to the manufacturer alerted step 780. If the Asset has not been sold, then the GPS tracking device queries whether the Asset is still outside the Geofence 760 and repeats. Once the Asset has been sold, the following steps occur: the manufacturer is alerted 780, the battery is installed in the Asset 790, and the GPS tracking device automatically switches to run off Asset battery 795 rather than GPS tracking device battery.

Figure 10:
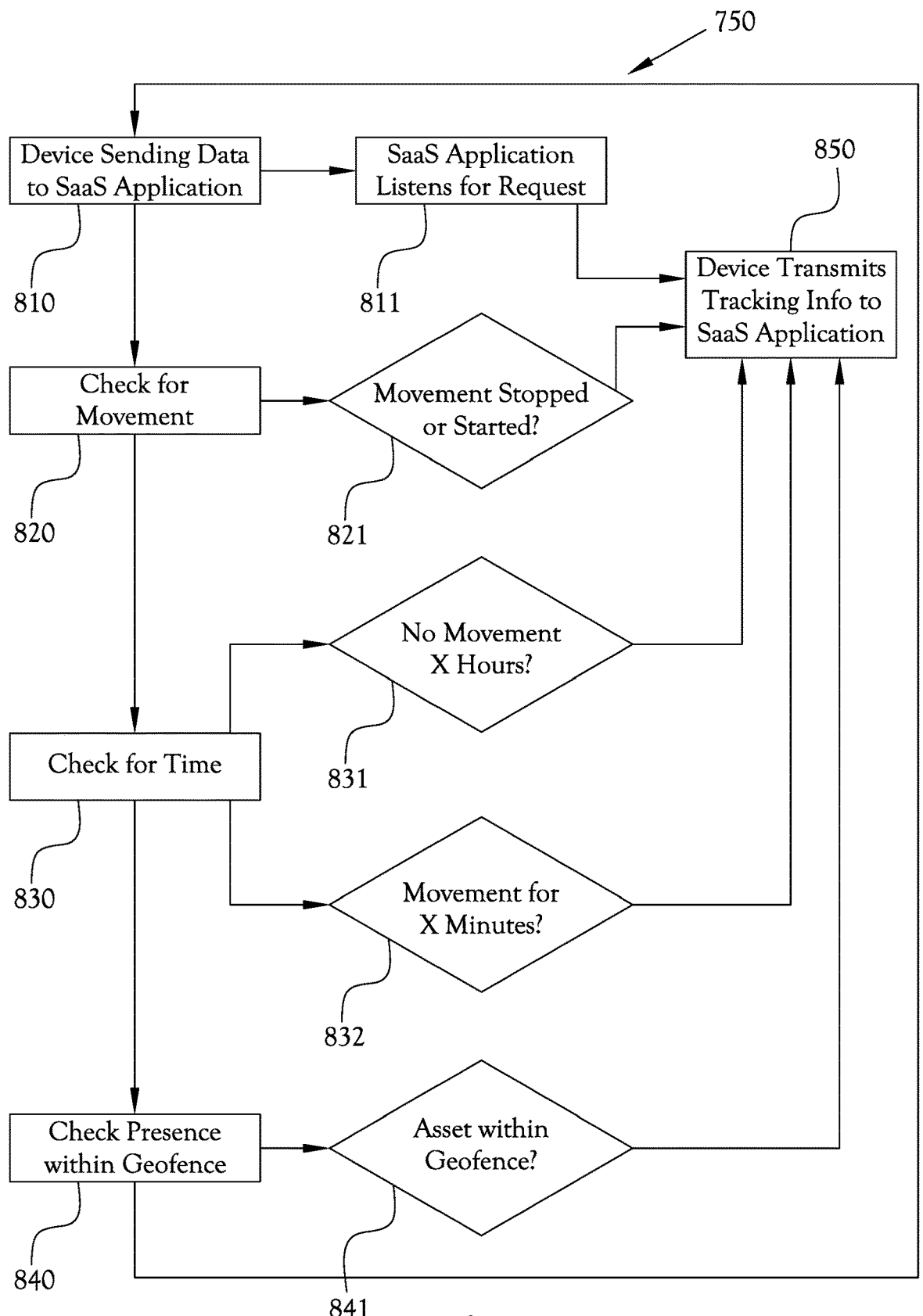
FIG. 10 is a flow diagram showing stages of the process while the GPS tracking device is in the full transmission mode

FIG. 10 represents the stages of the process while the GPS tracking device is in the full transmission mode shown in FIG. 9. Since the GPS tracking device will be located outside a Geofence during this step, outside the control of the dealer, full transmission mode will be required. In the first step, as previously shown in FIG. 5, the GPS tracking device is automatically sending data 810, while the SaaS Application listens for requests for position data transmissions from the GPS tracking device 811. Next, the GPS tracking device checks for movement using an accelerometer 820. If the GPS tracking device detects that movement has stopped or started 821, the GPS tracking device transmits tracking information to the SaaS Application 850. Next, the GPS tracking device checks the time durations 830 using its internal clock. If there has been no movement for a specified amount of time 831, then the GPS tracking device transmits tracking information to the SaaS Application 850. If there has been constant movement for over a specified amount of time 832, then the GPS tracking device transmits tracking information to the SaaS Application 850. Finally, the GPS tracking device checks the presence within a Geofence 840 as shown in FIG. 6 If the GPS tracking device has left a Geofence, then the GPS tracking device transmits tracking information to the SaaS Application 850. The system then repeats these actions in a loop as long as the GPS tracking device is not located within a Geofence. If the GPS tracking device is within a Geofence 841, then the mode switches to Geo Transmission mode shown in FIG. 5.

Figure 11:
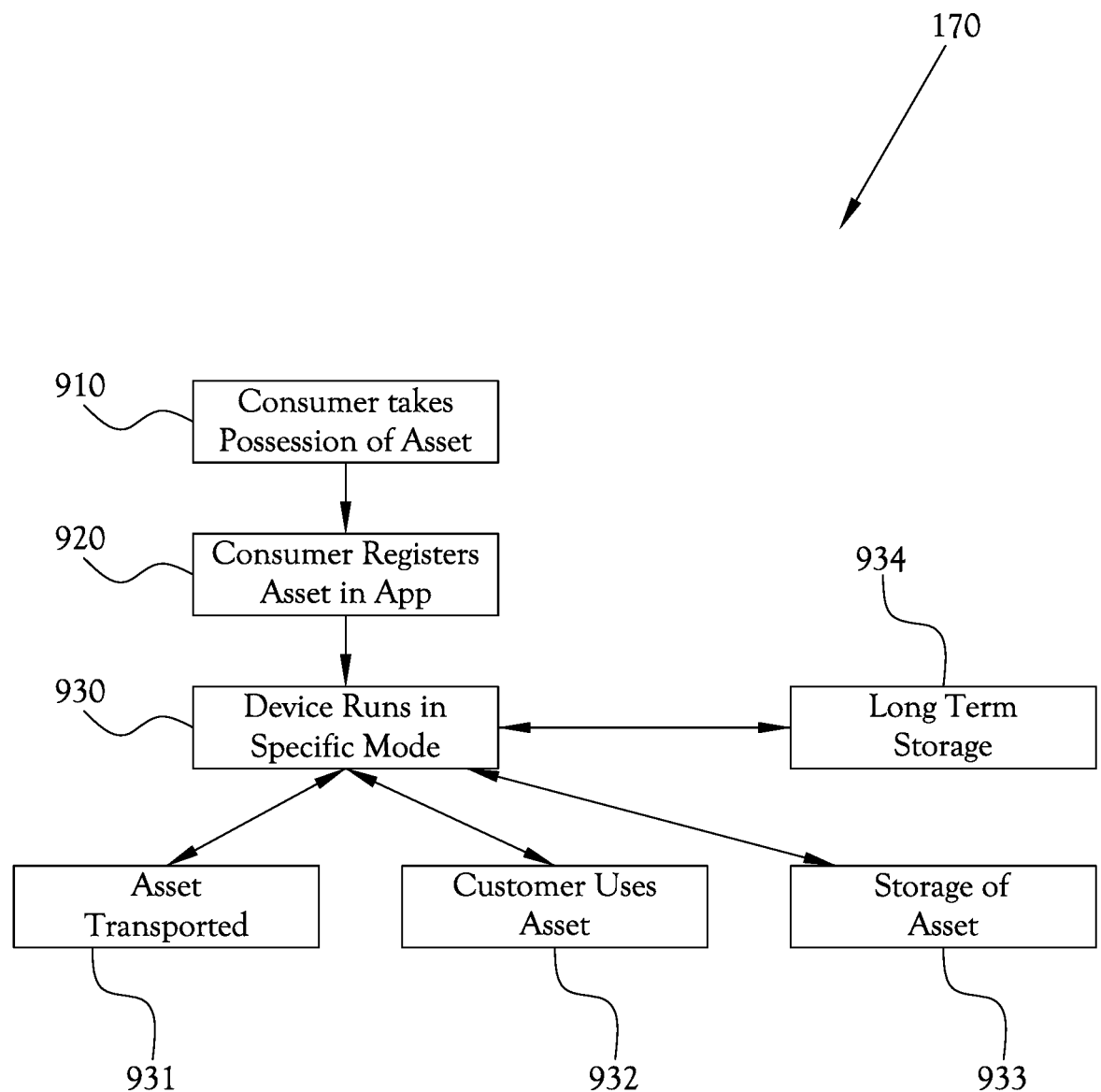
FIG. 11 is a flow diagram showing the consumer takes ownership step.

FIG. 11 represents the consumer takes ownership step of FIG. 3. In the first step, the consumer purchases the Asset and take possession of it 910. Next, the consumer registers the Asset with the SaaS Application 920. Finally, the GPS tracking device runs in full transmission mode (in order to gather the maximum amount of data), or in another specified mode 930 while the consumer is using the Asset. In addition to usage of the Asset 932, the Asset may be transported by the consumer 931, stored temporarily for usage 933, or held in long term storage 934. The GPS tracking device mode can be modified to best suit the given scenario. For example, during long term storage, continuous tracking may no longer be required until the device is once again in motion. As shown in FIG. 9, the consumer can run the GPS tracking device of the Asset battery 795 so as not to drain the GPS internal battery. The GPS tracking system can comprise IP69 waterproofing around the GPS tracking device.

While there have been described what are considered to be preferred embodiments of the present invention, it will be readily appreciated by those skilled in the art that modifications can be made without departing from the scope of the teachings herein. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

Having thus described the aforementioned invention, what is claimed is:

1. A system for GPS (Global Positioning System) tracking of moveable objects, comprising:
    a GPS tracking device attachable to a movable object, the GPS tracking device configured to gather tracking information of the moveable object as the moveable object is moved along phases of a supply chain from a manufacturer of the moveable object, to a dealer of the moveable object, and to a consumer of the moveable object;
    a software application configured to communicate with the GPS tracking device, the software application including attributed data corresponding to the moveable object; and
    firmware configured to instruct the GPS tracking device to transmit gathered tracking information to the software application at any phase of the supply chain including after the movable object has been sold to the customer at a frequency of transmission selectively determined by transmission rules provided to the firmware,
    wherein the software application is configured to update the transmission rules based on characteristics of transmitted tracking information, and wherein the software application is configured to determine whether the movable object has been sold to the consumer based on gathered tracking information and attributed data.

2. The GPS tracking system of claim 1, further including an accelerometer to determine if the GPS tracking device is moving or stationary, wherein the frequency of transmission is updated based on whether the tracking device has moved within a predetermined time frame.

3. The GPS tracking system of claim 1 wherein the software application includes a database configured to process the gathered tracking information and attributed data using a taxonomy associated with the moveable object.

4. The GPS tracking system of claim 1, wherein the attributed data includes one or more of serial number, year, make, model, accessories, manufacturer, dealer, and distributor of the moveable object, and wherein the software application is configured to create a report indicating how quickly moveable objects having various attributed data values are moving through the supply chain.

5. The GPS tracking system of claim 4, further comprising a user interface configured to interact with the software application to create the report, wherein the report includes experiential data related to use of the moveable object throughout the supply chain, including experiential data gathered after the moveable object has been sold to the consumer.

6. The GPS tracking system of claim 5, wherein the software application is configured to provide the report to one or more of a manufacturer, dealer, distributor, consumer, floor plan company, finance company, and insurance company on a subscription basis.

7. The GPS tracking system of claim 1, wherein when the GPS tracking device is installed to the moveable object, the GPS tracking device is configured to track a location of the moveable object relative to a geofence to determine if the moveable object has left the geofence, and wherein when the GPS tracking device determines the moveable object has left the geofence, the GPS tracking device is configured to query the software application to determine whether the moveable object has been sold to the consumer.

8. The GPS tracking system of claim 1, wherein when the software application determines the moveable object has been sold to the consumer, the GPS tracking device is configured to optionally run off a battery of the moveable object.

9. The GPS tracking system of claim 1, wherein when the software application determines the moveable object has been sold to the consumer, the software application is configured to alert the manufacturer of such sale.

10. The GPS tracking system of claim 1, wherein when the software application determines the moveable object has been sold to the consumer, the GPS tracking device is configured to gather data related to time periods of use of the moveable object by the consumer to track maintenance requirements of the moveable object.

* * * * *